United States Patent
Hammarwall et al.

(10) Patent No.: US 9,300,460 B2
(45) Date of Patent: Mar. 29, 2016

(54) METHODS AND APPARATUS FOR MULTIPLE CONNECTIVITY IN A TDD SYSTEM

(71) Applicant: Telefonaktiebolaget L M Ericsson (publ), Stockholm (SE)

(72) Inventors: David Hammarwall, Vallentuna (SE); Ali Behravan, Stockholm (SE); Daniel Larsson, Vallentuna (SE); Imadur Rahman, Sollentuna (SE); Eliane Semaan, Vällingby (SE); Xinghua Song, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 154 days.

(21) Appl. No.: 14/112,251

(22) PCT Filed: Jul. 17, 2013

(86) PCT No.: PCT/SE2013/050913
§ 371 (c)(1),
(2) Date: Oct. 17, 2013

(87) PCT Pub. No.: WO2014/109688
PCT Pub. Date: Jul. 17, 2014

(65) Prior Publication Data
US 2014/0192686 A1    Jul. 10, 2014

Related U.S. Application Data

(60) Provisional application No. 61/750,054, filed on Jan. 8, 2013.

(51) Int. Cl.
| | | |
|---|---|---|
| H04W 72/04 | (2009.01) | |
| H04L 5/14 | (2006.01) | |
| H04W 72/00 | (2009.01) | |

(52) U.S. Cl.
CPC ............ *H04L 5/14* (2013.01); *H04W 72/00* (2013.01)

(58) Field of Classification Search
None
See application file for complete search history.

(56) References Cited

U.S. PATENT DOCUMENTS

| | | | | |
|---|---|---|---|---|
| 6,021,326 | A * | 2/2000 | Nguyen | ............ 455/422.1 |
| 2007/0014265 | A1 * | 1/2007 | Casaccia | ............ 370/337 |

(Continued)

FOREIGN PATENT DOCUMENTS

| | | |
|---|---|---|
| WO | 2010049587 A1 | 5/2010 |
| WO | 2012113131 A1 | 8/2012 |

OTHER PUBLICATIONS

3rd Generation Partnership Project, "LTE Release 12 and Beyond", 3GPP RAN WS on Rel-12 and onwards, Jun. 11-12, 2012, pp. 1-10, Ljubljana, Slovenia, RWS-120003.

(Continued)

*Primary Examiner* — Chi H Pham
*Assistant Examiner* — Shick Hom
(74) *Attorney, Agent, or Firm* — Coats & Bennett, PLLC

(57) ABSTRACT

A wireless communication system (14) comprises points that have time division duplex, TDD, configurations. Information is obtained indicating the TDD configuration of each of multiple points to which a particular wireless communication device (6) is simultaneously connected. Based on this obtained information, it is determined that one or more time-domain radio resources used by the multiple points are conflicting resources defined by the TDD configuration of one or more of the multiple points as being uplink resources and defined by the TDD configuration of one or more others of the multiple points as being downlink resources. For the device (6), each of the one or more conflicting resources are resolved as either an uplink resource to be used by the device (6), a downlink resource to be used by the device (6), or a resource not to be used by the device (6), based on one or more rules for optimizing use of conflicting resources.

24 Claims, 9 Drawing Sheets

(56) References Cited

U.S. PATENT DOCUMENTS

| | | | |
|---|---|---|---|
| 2008/0212501 A1* | 9/2008 | Harrang et al. | 370/281 |
| 2010/0008332 A1* | 1/2010 | Balachandran et al. | 370/336 |
| 2011/0211503 A1* | 9/2011 | Che et al. | 370/280 |
| 2013/0336177 A1* | 12/2013 | Gao et al. | 370/280 |

OTHER PUBLICATIONS

Alcatel-Lucent Shanghai Bell et al., "Evaluation for multiple outdoor Pico-cells scenario with Macro layer and discussion of interference mitigation", 3GPP TSG RAN WG1 Meeting #69, May 21-25, 2012, pp. 1-8, Prague, Czech Republic, R1-122507.

Shen, Z. et al., "Dynamic Uplink-Downlink Configuration and Interference Management in TD-LTE", IEEE Communications Magazine, Nov. 2012, pp. 51-59, vol. 50, No. 11.

3rd Generation Partnership Project, "Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11)", Jun. 2012, pp. 1-109, 3GPP TR 36.828 V11.0.0.

3rd Generation Partnership Project, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.3.0, Table 4.2-2: Uplink-downlink configurations, Jun. 1, 2013, pp. 12, 3GPP, France.

* cited by examiner

METHODS AND APPARATUS FOR MULTIPLE CONNECTIVITY IN A TDD SYSTEM

RELATED APPLICATIONS

This application claims priority from U.S. Provisional Patent App. No. 61/750,054 filed Jan. 8, 2013, which is incorporated herein by reference in its entirety.

TECHNICAL FIELD

The present application generally relates to a wireless communication system, and particularly relates to a system in which a wireless communication device simultaneously connects to multiple points that have time division duplex configurations.

BACKGROUND

In a duplex wireless communication system, a radio network node and a wireless communication device communicate with one another in both the uplink direction (from the device to the radio node) and the downlink direction (from the radio node to the device). The duplexing system is referred to as a frequency-division duplexing (FDD) system if the radio node and the device communicate in the uplink direction at the same time as communicating in the downlink direction, but over different carrier frequencies or bandwidths. By contrast, the duplexing system is referred to as a time-division duplexing (TDD) system if the radio node and the device communicate in the uplink direction over the same carrier frequency or bandwidth as communicating in the downlink direction, but at different times.

More specifically, a TDD system employs different radio resources in the time domain for communication. In many TDD systems, these time-domain radio resources are referred to as subframes, with a defined number of consecutive subframes (e.g., 10) being referred to as a frame. See, for instance, FIG. 1, which shows the subframes of a TDD system based on the Long Term Evolution (LTE) standard. Regardless, some subframes within any given frame are allocated for uplink (UL) communication and other subframes within the frame are allocated for downlink (DL) communication (with a switch between downlink and uplink occurring in a special subframe). This description uses the term "subframe" interchangeably with time-domain radio resources, and therefore should be understood as applicable to any TDD system, not just those based on LTE.

A dynamic TDD system employs different TDD configurations (also referred to as uplink-downlink configurations). Different TDD configurations define a different relative number and/or arrangement of UL and DL subframes within a frame. See, for instance, the 7 different TDD configurations shown in FIG. 2 for LTE-TDD systems. A configuration is asymmetric if it has more UL subframes than DL subframes so as to be UL-heavy, or vice versa. An UL-heavy configuration has greater capacity for UL traffic than DL traffic, while a DL-heavy configuration has greater capacity for DL traffic than UL traffic.

Notably, any given radio network node of a dynamic TDD system dynamically adapts its TDD configuration. This adaptation may occur on a relatively quick basis (e.g., on a frame by frame basis) to accommodate the node's instantaneous amount of DL traffic and UL traffic, and/or on a relatively slower basis in order to accommodate the node's UL/DL traffic pattern or characteristics. In at least some systems, a radio network node dynamically selects its TDD configuration from a set of predefined configurations. This differs from FDD systems in which a given bandwidth is allocated to either UL or DL regardless of the traffic and need of a node. Regardless, each node performs this dynamic TDD configuration adaptation independently.

The cost of dynamic TDD configuration (i.e., UL/DL dynamic resource adaptation) is the cross interference between UL and DL that arises when neighboring nodes (i.e., base stations) use different TDD configurations. This cross interference is base station to base station interference and/or device to device interference, and does not occur in FDD systems. In some cases, these interferences can become very severe and detrimentally impact the system performance.

Known approaches to TDD system implementation have not contemplated TDD systems being used in conjunction with so-called dual or multiple connectivity. Envisioned thus far outside the context of any TDD system, a multiple-connected wireless communication device connects to multiple different radio network nodes. The device transmits to one or more of the radio nodes while simultaneously receiving from one or more of the other radio nodes. In essence, multiple independent communication links (e.g., up to at least the radio link control, RLC, layer) are associated with the different radio network nodes as different transmission/reception points. In practice, the network points may be in different layers of the system, as shown for instance in FIG. 3, where a device is dually connected to both a high power base station and a low power base station. However, inter-pico dual connectivity may be practiced as well. Thus, multiple connectivity can be used in many different scenarios and in different ways (e.g. the device may be simultaneously connected to multiple network points on the same or separate frequency, the UL and DL transmissions may be decoupled or not, etc).

SUMMARY

One or more embodiments herein envision a time division duplex, TDD, system being used in conjunction with multiple connectivity, recognize various problems that may arise in that situation, and address those problems to improve system performance.

More particularly, in one or more embodiments, a method is implemented in a wireless communication system comprising points that have TDD configurations, which in some embodiments are independent. The method includes obtaining information indicating the TDD configuration of each of multiple points to which a particular wireless communication device is simultaneously connected. This particular device is incapable of simultaneous uplink and downlink communication. The method further includes determining, based on the obtained information, that one or more time-domain radio resources are conflicting resources. Conflicting resources are defined by the TDD configuration of one or more of the multiple points as being uplink resources and also defined by the TDD configuration of one or more others of the multiple points as being downlink resources. The method then resolves, for the particular device, each of the one or more conflicting resources as either an uplink resource to be used by the device, a downlink resource to be used by the device, or a resource not to be used by the device, based on one or more rules for optimizing use of conflicting resources.

In one or more embodiments, at least one of the one or more rules directly or indirectly specifies that each conflicting resource is to be resolved depending on a comparison of one or more attributes or characteristics of any downlink information contending for transport over that resource with one or more attributes or characteristics of any uplink information also contending for transport over that resource.

In one or more embodiments, at least one of the one or more rules directly or indirectly specifies that each conflicting resource is to be resolved as a downlink resource or as an uplink resource depending respectively on whether the content of any downlink information contending for transport over that resource or the content of any uplink information also contending for transport over that resource is defined as more important.

In one or more embodiments, at least one of the one of the one or more rules directly or indirectly specifies that each conflicting resource is to be resolved as a downlink resource or as an uplink resource depending respectively on whether the point from which any downlink information contending for transport over that resource or the point to which any uplink information also contending for transport over that resource is defines as having a higher priority.

In one or more embodiments, at least one of the one or more rules directly or indirectly specifies that each conflicting resource is to be resolved as a downlink resource or as an uplink resource depending respectively on whether any downlink information contending for transport over that resource or any uplink information also contending for transport over that resource is more likely to be reliably transported over the resource.

In one or more embodiments, at least one of the one or more rules directly or indirectly specifies that each conflicting resource is to be resolved as a downlink resource or as an uplink resource depending respectively on whether the amount of any downlink information contending for transport over that resource or the amount of any uplink information also contending for transport over that resource is greater.

In one or more embodiments, these one or more rules govern resolving collectively for a set of multiple conflicting resources, so as to collectively optimize use of that set.

In one or more embodiments, such collective resolution comprises time multiplexing resources resolved as downlink resources with resources resolved as uplink resources In one or more embodiments, the one or more rules directly or indirectly specify that each conflicting resource is to be unconditionally resolved as a resource not to be used by the device, such that conflicting resources remain reserved for devices not simultaneously connected to multiple points.

In one or more embodiments, the method is implemented by the device and is further characterized by refraining from monitoring for control information associated with data transmission over conflicting resources.

In one or more embodiments, at least one of the points is associated with downlink transmissions to the device and at least one other of the points is associated with uplink transmissions from the device. In this case, the one or more rules condition a conflicting resource being resolved as a downlink resource on a level of device-to-device interference being below a defined threshold level.

In one or more embodiments, the method is further characterized by constructing a window for automatic repeat request feedback from the device to exclude any conflicting resources.

In one or more embodiments, the method is implemented by the device and the one or more rules directly specify that the device is to perform resource resolution in accordance with resource specific resolution instructions received from one or more of the multiple points to which the device is connected.

In one or more embodiments, the method is implemented by a based station configured to provide one of the multiple points. Moreover, the method is further characterized by generating resource-specific resolution instructions for each of the one or more conflicting resources, and transmitting the generated instructions to the device.

In one or more embodiments, resolution by a base station is performed in cooperation with resource resolution performed by one or more other base stations providing one or more other multiple points. Such is performed to ensure that only one of the base stations instruct the device to resolve a given conflicting resource as either a downlink resource or as an uplink resource to be used by the device. Instead, other base stations instruct the device to resolve the given conflicting resource as a resource not to be used by the device.

In one or more embodiments, such resource-resolution instructions for each of the one or more conflicting resources implicitly indicate how the conflicting resource is to be resolved. The instructions do so by indicating whether the device has been scheduled for an uplink transmission to or a downlink transmission from a given point over the conflicting resource.

In one or more other embodiments, a method is implemented by a base station as a point in a wireless communication system. The method is characterized by obtaining information directly or indirectly indicating how many wireless communication devices connected to the point are connected or capable of connecting to multiple points in the system. Based on the obtained information, the method then adjusts how often the base station dynamically adapts its TDD configuration to accommodate the point's uplink/downlink traffic pattern.

In one or more embodiments, such adjusting comprises switching between a dynamic TDD mode and a fixed or semi-fixed TDD mode. The base station dynamically adapts its TDD configuration more often in dynamic mode than in semi-fixed mode, and does not adapt its configuration in fixed mode.

In one or more embodiments, switching between TDD modes comprises switching to dynamic TDD mode when there are at least a certain number of multiple-connected devices connected to the point, relative to the number of non-multiple-connected devices connected to the point. These one or more embodiments further comprise switching to fixed or semi-fixed TDD mode when there are at least a certain number of multiple-connected devices connected to the point.

Embodiments also include an apparatus configured to perform the various methods herein.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

The invention is now described, by way of example, with reference to the accompanying drawings, in which.

DETAILED DESCRIPTION

Figure 4:
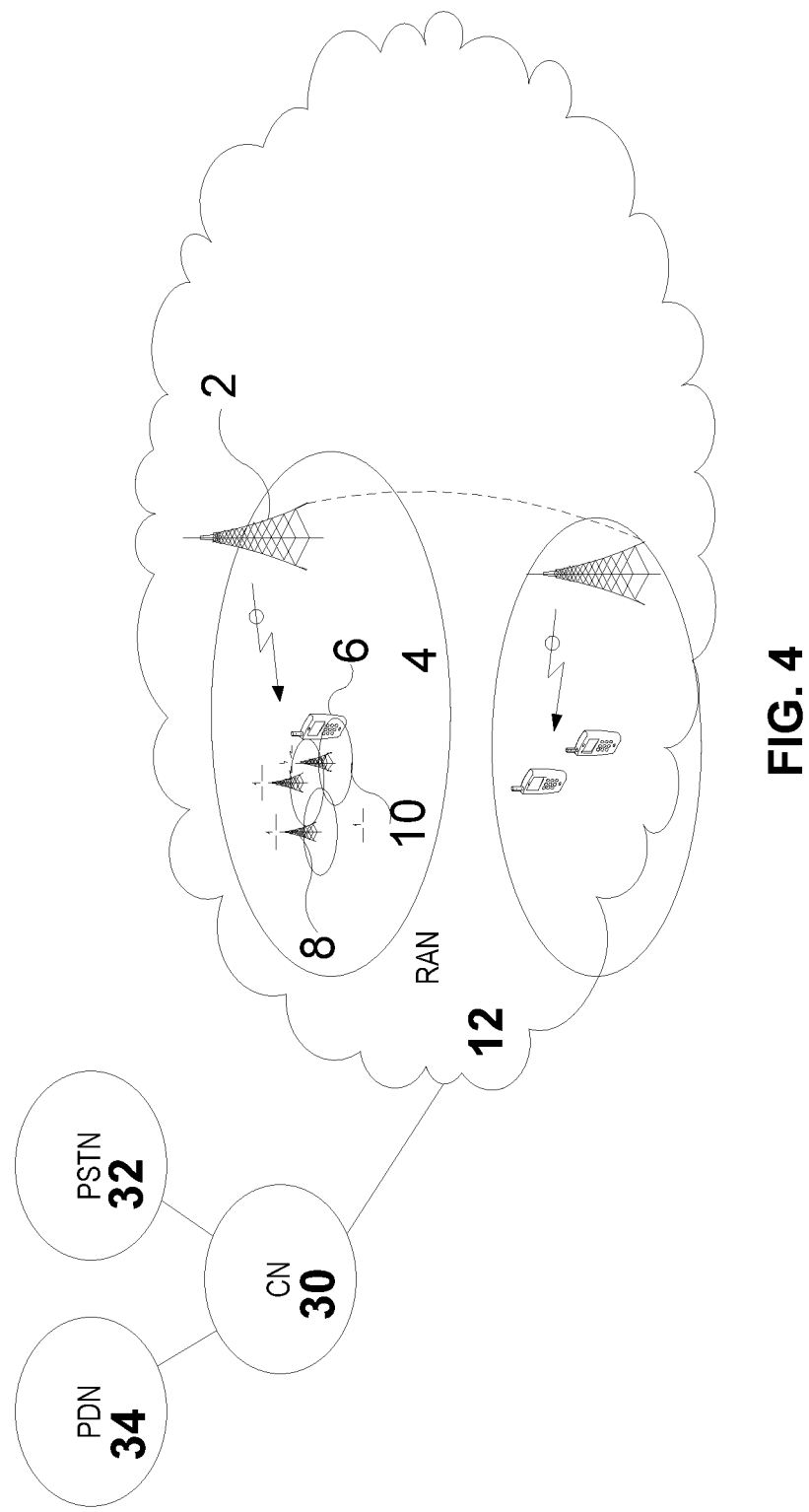
FIG. 4 is a block diagram that illustrates a wireless communication system according to one or more embodiments.

FIG. 4 illustrates a wireless communication system 14 that includes a radio access network (RAN) 12 and a core network (CN) 30. As shown, the RAN 12 provides one or more wireless communication devices 6 with access to the CN 30 over radio resources. The CN 30 in turn communicatively couples the RAN 12 to one or more external networks, such as a public switched telephone network (PSTN) 32, a packet data network (PDN) 34 such as the Internet, or the like.

The RAN 12 in particular contains multiple different transmission/reception points, shown as multiple different base stations. These points in some embodiments are in different layers of the system 14. As shown, for example, a relatively high power base station 2 functions as a transmission/reception point in a macro layer (e.g., by providing a macro cell 4), while a relatively low power base station 8 functions as a transmission/reception point in a pico layer (e.g., by providing a pico cell 10).

Regardless, any given point communicates with a wireless communication device over time-domain radio resources (e.g., subframes in an LTE system). A point does so by employing time division duplexing (TDD) according to that point's so-called TDD configuration. As used herein, a point's TDD configuration defines which time-domain radio resources used by that point are uplink resources and which time-domain radio resources used by that point are downlink resources. For example, a point's TDD configuration in some embodiments defines a relative number and/or arrangement of uplink and downlink time-domain radio resources within a defined number of consecutive resources. In any event, the points in the system 14 have TDD configurations. In some embodiments, these TDD configurations are independent, meaning that the TDD configuration employed by one point does not depend on the TDD configuration employed by another point.

Figure 5:
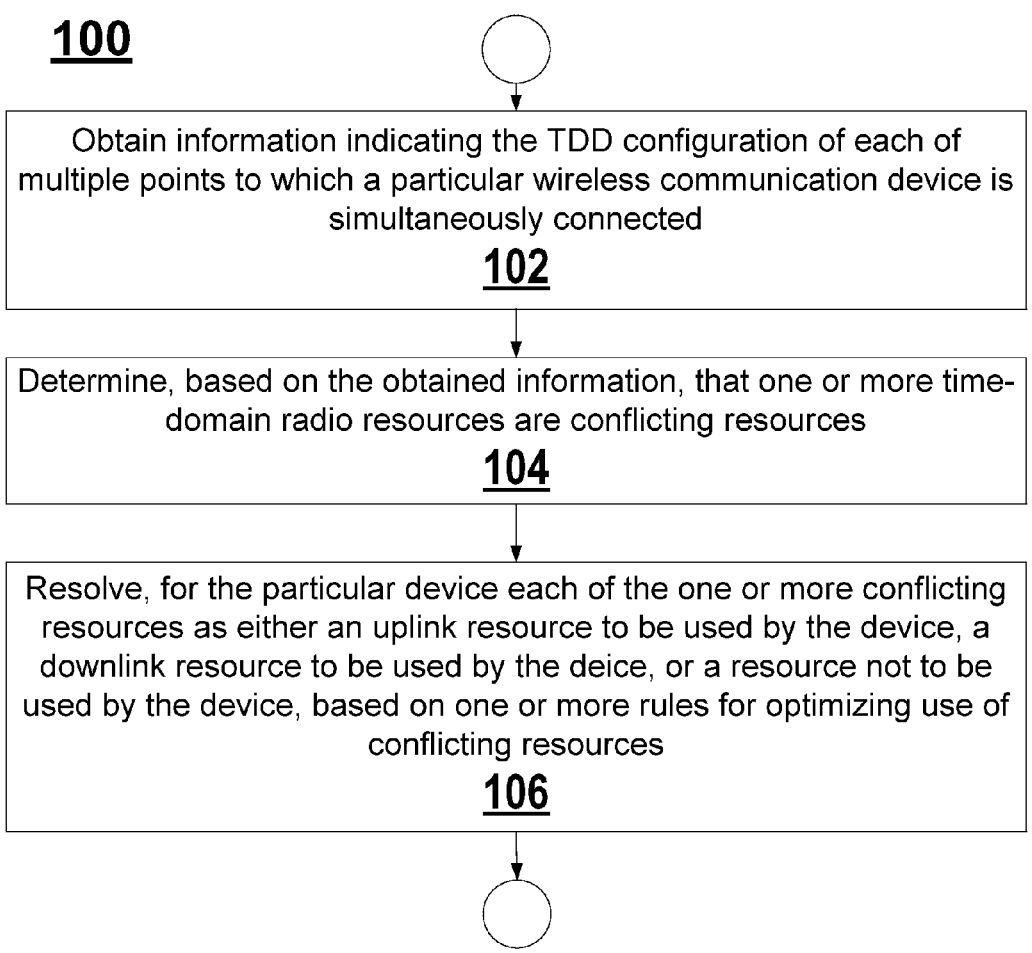
FIG. 5 is a logic flow diagram that illustrates a method implemented in a wireless communication system according to one or more embodiments.

In this context, at least one particular wireless communication device 6 in the system 14 is configured to simultaneously connect to multiple points. In some embodiments, for example, the device 6 is configured to simultaneously connect to both a high power base station 2 and a low power base station 8. Regardless, embodiments herein recognize that, since different points to which the device 6 simultaneously connects have different TDD configurations in some scenarios, those TDD configurations have the potential to conflict with one another. FIG. 5 illustrates a method 100 implemented in the system 14 to advantageously address this problem according to one or more embodiments.

As shown in FIG. 5, the method 100 includes obtaining information indicating the TDD configuration of each of the multiple points to which the particular wireless communication device 6 is simultaneously connected (Block 102). In some embodiments, for example, this entails receiving such information via downlink control signaling from each respective point. Regardless, the method 100 further includes determining, based on the obtained information, that one or more time-domain radio resources are conflicting resources (Block 104). Such conflicting resources are defined by the TDD configuration of one or more of the multiple points as being uplink resources and defined by the TDD configuration of one or more others of the multiple points as being downlink resources. In other words, the TDD configurations conflict with one another for at least some time-domain radio resources and those resources are appropriately referred to as conflicting resources. Notably, though, the method 100 further entails resolving, for the particular device 6, each of the one or more conflicting resources as either an uplink resource to be used by the device 6, a downlink resource to be used by the device 6, or a resource not to be used by the device 6, based on one or more rules for optimizing the use of conflicting resources (Block 106).

Figure 1:
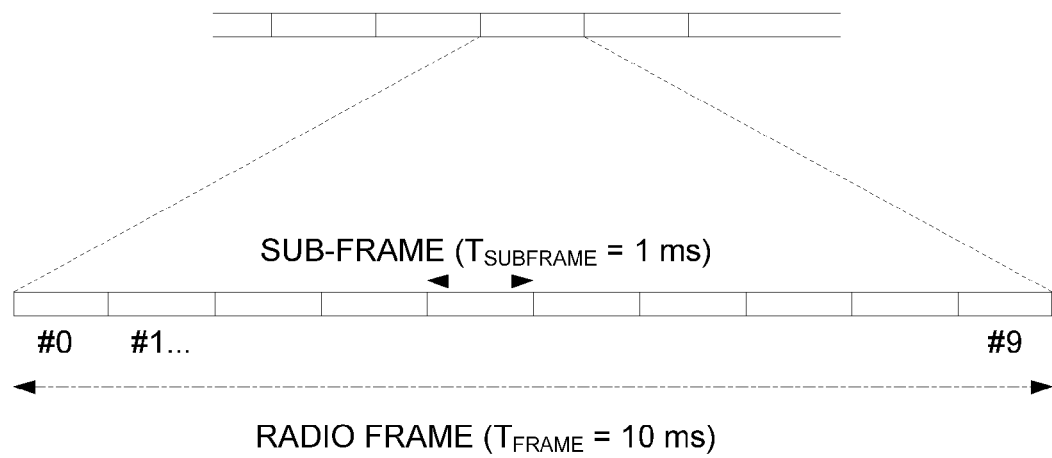
FIG. 1 is a block diagram which illustrates the subframes of a TDD system based on the LTE standard.
Figure 2:
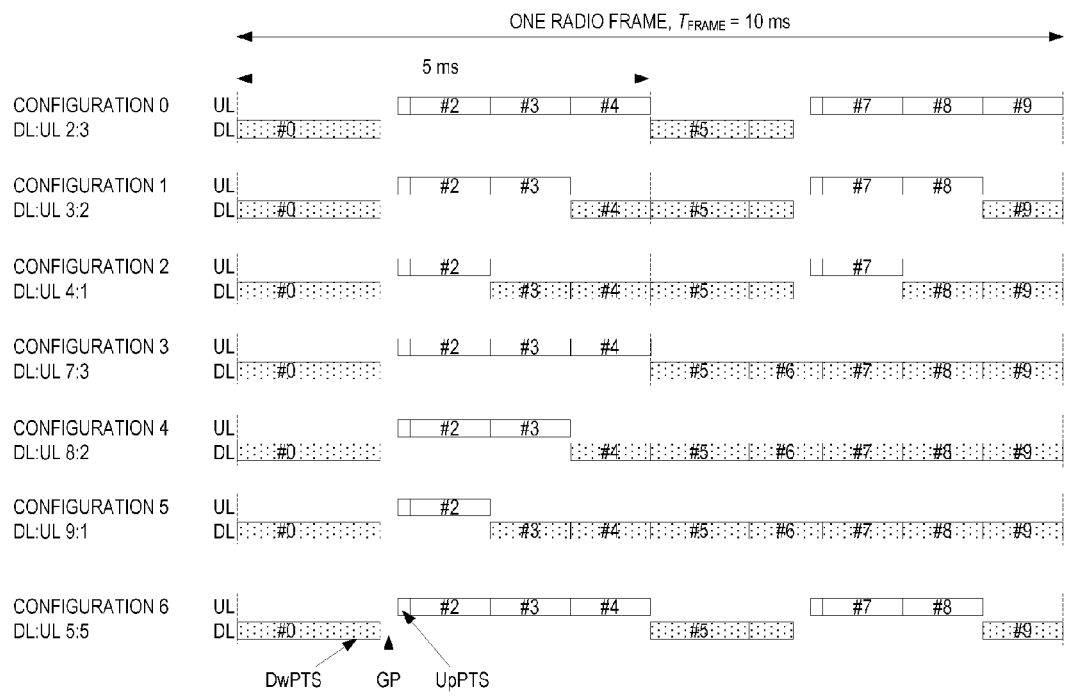
FIG. 2 is a block diagram which illustrates the seven different TDD configurations for LTE-TDD systems.
Figure 3:
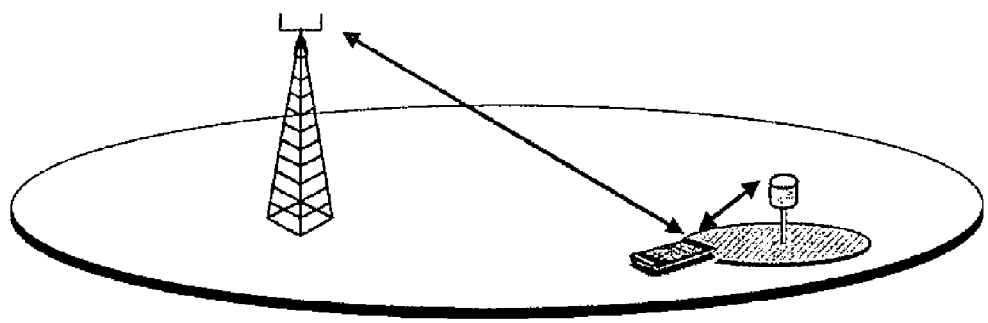
FIG. 3 is a block diagram that illustrates a wireless communication device, dually connected to both a high power base station and a lower power base station.
Figure 6:
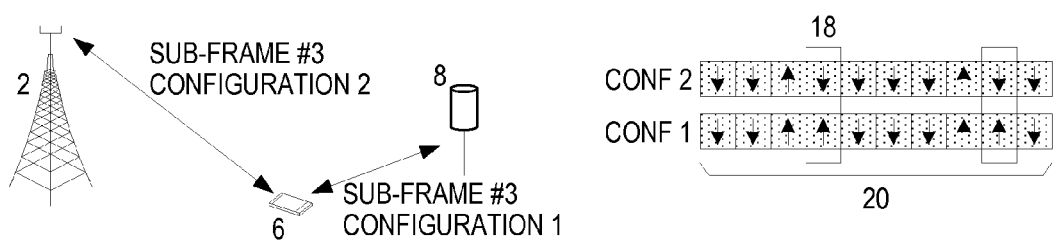
FIG. 6 illustrates an example scenario in which conflicting resource resolution according to the method of FIG. 5 is performed, according to one or more embodiments.

Resolving conflicting resources in this way proves advantageous in a number of situations. Consider for instance the situation shown in FIG. 6 where the wireless communication device 6 is simultaneously connected to both a high power base station 2 and a low power base station 8 in an LTE system. The high power base station 2 as shown operates with LTE TDD configuration index number 2, while the low power base station 8 operates with LTE TDD configuration index number 1 (see FIG. 2 for the definition of these configurations). According to the different TDD configurations, the wireless communication device 6 is to use subframe 18 as an uplink resource for transmitting to the low power base station 8, while simultaneously (and with the same frequency resources) using subframe 18 as a downlink resource for receiving from the high power base station 2.

Figure 7:
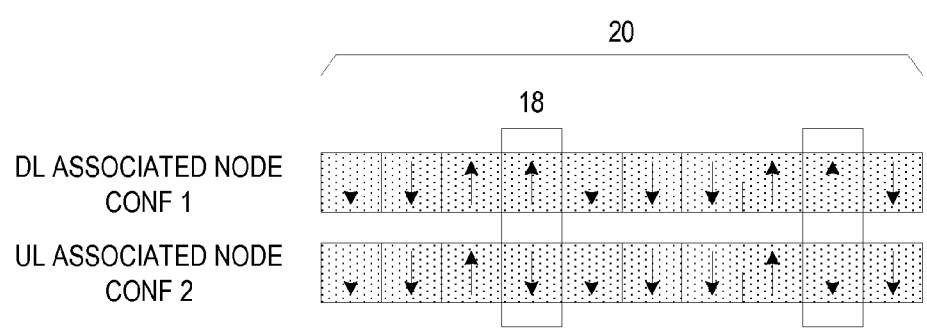
FIG. 7 illustrates another example scenario in which conflicting resource resolution according to the method of FIG. 5 is performed, according to one or more embodiments.

Consider also the situation shown in FIG. 7. In this situation, the wireless communication device 6 is simultaneously connected to a point associated with downlink transmissions (e.g., a point with highest received power), as well as a point associated with uplink transmissions (e.g., a point with lowest path loss). The downlink associated point operates with LTE TDD configuration index number 1, while the uplink associated point operates with LTE TDD configuration index number 2. This means that the wireless communication device 6 according to the different TDD configurations is to use subframe 18 as an uplink resource for transmitting to the downlink associated point, while simultaneously using subframe 18 as a downlink resource for receiving from the uplink associated point.

Despite the apparent conflict between the different TDD configurations in these situations, though, one or more embodiments herein advantageously identify subframe 18 as a conflicting subframe and then resolve subframe 18 for the particular device 6 based on one or more rules. Provided with such direction on how to use subframe 18, the device 6 advantageously uses the subframe 18 in an optimal way, e.g., in a way that optimizes system 14 performance.

Regardless of the particular situation to which such conflicting resource resolution is applied, one or more of the rules in some embodiments govern resource resolution on a resource by resource basis or granularity. That is, a decision about how to resolve any given conflicting resource is made independently of a decision about how to resolve another conflicting resource. This means that conflicting resource use is likewise optimized on a resource by resource basis. In this case, one or more of the rules define respective conditions under which resolution of a given conflicting resource as a downlink resource or as an uplink resource is deemed to optimize use of that resource, irrespective of how any other conflicting resources are resolved.

In some embodiments, for example, at least one of the rules for optimizing the use of conflicting resources directly or indirectly specifies that each conflicting resource is to be resolved depending on a comparison of one or more attributes or characteristics of any downlink information contending for transport over that resource with one or more attributes or characteristics of any uplink information also contending for transport over that resource. In at least one embodiment, one such attribute or characteristic comprises the importance of the information's content. That is, at least one of the rules directly or indirectly specifies that each conflicting resource is to be resolved as a downlink resource or as an uplink resource depending respectively on whether the content of any downlink information contending for transport over that resource or the content of any uplink information also contending for transport over that resource is defined as more important.

For example, where uplink information content pertaining to HARQ or sounding reference symbols (SRSs) is contending for communication over a conflicting resource, the resource in some embodiments is to be resolved as an uplink resource. Indeed, that uplink information content is more important than any downlink information, since downlink throughput would suffer without that uplink information. As broadly illustrated by this example, therefore, the importance of information content in one or more embodiments is indicated by the type of that information, the effect that the information's reliable transport has on downlink or uplink quality of service or throughput, and/or the time-sensitivity of that information. Accordingly, resource resolution in some embodiments is performed based on the type of information contending for transport, e.g., control information, data, etc.

Alternatively or additionally, at least one of the rules in some embodiments directly or indirectly specifies that each conflicting resource is to be resolved as a downlink resource or as an uplink resource depending respectively on whether the point from which any downlink information contending for transport over that resource or the point to which any uplink information also contending for transport over that resource is defined as having a higher priority. That is, resource resolution is performed by prioritizing the points involved, so as to in a sense perform resource resolution based on the source and/or destination of the information to be transported.

For example, consider a situation where information to be transmitted to or received from a high power node 2 (e.g., macro base station 2) over a conflicting resource is contending with information to be transmitted to or received from a low power node 8 (e.g., pico base station 8). In one or more embodiments, the resource is to be resolved in accordance with the high power node's TDD configuration rather than the low power node's TDD configuration. Indeed, communication with a high power node as a source or destination is deemed to have higher priority than communication with a low power node 8 as a source or destination.

As another example, in a macro assisted/controlled small cells deployment scenario, resource resolution is performed so that the device 6 will follow the TDD configuration (i.e., the direction of the subframe to be used) of macro nodes. That is, if a pico node's direction is different than a macro node's direction for a given subframe, the device 6 refrains from using the subframe for the link to the pico node. Similarly, in an anchor-booster scenario, resource resolution is performed in some embodiments so that the wireless communication device 6 always follows the TDD configuration in the anchor link.

Alternatively or additionally, at least one of the rules in some embodiments directly or indirectly specifies that each conflicting resource is to be resolved as a downlink resource or as an uplink resource depending respectively on whether any downlink information contending for transport over that resource or any uplink information also contending for transport over that resource is more likely to be reliably transported over the resource. For example, where information to be transmitted to or received over a link with good quality is contending with information to be transmitted to or received over a link with bad quality, the conflicting resource at issue is to be resolved in accordance with the TDD configuration of the point associated with the good quality link rather than the TDD configuration of the point associated with the bad quality link. Indeed, the information to be transmitted to or received over the good quality link is more likely to be reliably transported. For instance, the bad quality link may be subject to base station to base station interference, as may be the case for example where the bad quality link is an uplink to a first base station (e.g., pico base station) that is being interfered with by the downlink of a second base station (e.g., macro base station). Here, the method entails in some embodiments obtaining a measurement of the base station to base station interference affecting a link and applying the one or more rules specified in terms of that interference in order to perform conflicting resource resolution. In other embodiments, by contrast, the method entails simply presuming that an uplink to one base station will be interfered with by the downlink of another base station, meaning that the method effectively prioritizes downlink over uplink for a conflicting resource. Broadly, therefore, resource resolution in these embodiments is performed based on the presumed or measured likelihood that information will be reliability transported.

As one example, the method entails choosing to receive or transmit in asymmetric subframes 18 based on the estimated link quality to the downlink, respectively, uplink node/eNodeB. In this case, resolution involves allocating these subframes 18 to the downlink transmissions if the link quality to the downlink node is better than that of the uplink node, and vice versa.

Still alternatively or additionally, at least one of the rules in some embodiments directly or indirectly specifies that each conflicting resource is to be resolved as a downlink resource or as an uplink resource depending respectively on whether the amount of any downlink information contending for transport over that resource or the amount of any uplink information also contending for transport over that resource is greater. For example, where a relatively large amount of downlink information to be transported is contending with a relatively small amount of uplink information (if any) to be transported, the conflicting resource at issue is to be resolved as a downlink resource. This is because in this example the need for downlink is greater than the need for uplink. This last example may be generalized, therefore, as the one or more rules specifying that any given conflicting resource is to be resolved as either a downlink resource or an uplink resource depending on the relative need for downlink or uplink.

For example, if no uplink information is pending for communication in the conflicting resource, then the resource is to be resolved as a downlink resource. In LTE terms, this means that if the device 6 is not transmitting in the uplink for a specific subframe 18 then the device 6 shall receive downlink transmissions from the applicable node or point. This is possible at least in LTE because the uplink and downlink transmission is not determined at the same time. A device 6 does not need to transmit UL in a specific subframe if it has not received an UL grant for that subframe or if it does not need to send an HARQ-ACK feedback in that subframe (e.g., because the device 6 was not scheduled with DL transmissions in the previous subframe).

Regardless, in some embodiments, the amount of information contending for transport is determined based on the uplink and downlink buffer status or traffic pattern. A network node in such embodiments informs the device 6 regarding the allocation of a conflicting subframe 18, i.e., as either an uplink subframe or a downlink subframe. If the conflicting subframe 18 is allocated for uplink transmission, then the device 6 is provided in one or more embodiments with this information some time in advance (e.g. 4 ms in advance for uplink grants).

Of course, while many of the above exemplary rules particularly focus on resolving a conflicting resource as either an uplink resource or a downlink resource, one or more other rules in some embodiments focus on resolving a conflicting resource as a resource not to be used by the device 6. In at least one embodiment, for example, one or more of the rules directly or indirectly specify that each conflicting resource is to be unconditionally resolved as a resource not to be used by the device 6. In some of these embodiments, this is performed as part of a broader strategy to resolve conflicting resources in this way for all devices actually connected to (or capable of connecting to) multiple points. In this case, therefore, resolution effectively amounts to refraining from scheduling multiple-connected devices during conflicting resources, thereby reserving those resources for devices not simultaneously connected to multiple points (including legacy devices not even capable of multiple point connections).

For example, where each point is aware of the TDD configurations used in neighboring points, different points in some embodiments choose not to schedule wireless communication devices that support dual (or multiple) connectivity in asymmetric sub-frames. These sub-frames may then only be used for legacy wireless communication devices in the serving point (i.e., devices that do not support dual connectivity).

At least some embodiments exploit this effective reservation of conflicting resources for non-multiple connected devices in order to optimize processing resources of multiple connected devices. In one embodiment, for example, the wireless communication device 6 advantageously refrains from monitoring for control information associated with data transmissions over conflicting resources. As a particular implementation of this in some LTE embodiments, a higher layer signaled subframe set is defined such that the wireless communication device 6 will not monitor downlink DCIs in conflicting subframes, since the device 6 does not expect downlink transmissions within those subframes. Alternatively or additionally, the wireless communication device 6 skips monitoring certain uplink grants from a point to which it is connected; namely, uplink grants in previous downlink subframes associated with the uplink transmission of a conflicting subframe. This is because the device 6 does not expect uplink transmissions to occur in a conflicting subframe either.

Regardless of the particular implementation of the one or more rules governing resource resolution, though, the one or more rules in some embodiments govern resource resolution collectively for a set of multiple conflicting resources, so as to collectively optimize use of that set. In one embodiment, this set of multiple conflicting resources comprises those conflicting resources (e.g., subframes 18) in a frame 20, such that resource resolution is governed on a frame-by-frame basis or granularity. Regardless of the particular granularity, however, this means that a decision about how to resolve any given conflicting resource not only depends on the criteria discussed above for optimizing use of that individual conflicting resource, but also depends on or is otherwise made in conjunction with a decision about how to resolve another conflicting resource.

Collective resolution decisions in some embodiments depend on time constraints or other time considerations, such as considerations about the fairness between the relative time allotted for downlink and uplink. In one example, therefore, collective resource resolution involves multiplexing downlink resolutions with uplink resolutions in time, so as to alternate between resolving conflicting resources as downlink resources and resolving conflicting resources as uplink resources. That is, resolution is performed so as to time-multiplex conflicting resources resolved as downlink resources with conflicting resources resolved as uplink resources. Of course, any number of consecutive downlink resolutions may be made before alternating to any number of consecutive uplink resolutions, depending for instance on the traffic load, the need for control information, or the like.

In any event, the method for resource resolution shown in FIG. 5 is performed by the particular wireless communication device 6 and/or a point or base station to which that device 6 is connected. Which entity performs the method has implications in at least some embodiments on how the rules used by that entity are specified.

For example, in some embodiments where resolution depends on attributes or characteristics of information contending for transport, resolution just entails the device 6 performing the method of FIG. 5 by actually determining and evaluating those attributes or characteristics. The device 6 then applies one or more rules that are directly specified in terms of the evaluated attributes or characteristics.

By contrast, in other embodiments where resolution depends on attributes or characteristics of information contending for transport, resolution entails a base station (as a point) first performing the method of FIG. 5, followed by the device 5 also performing the method of FIG. 5. Specifically, the base station performs the method of FIG. 5 by actually determining and evaluating the attributes or characteristics of the information contending for transport. The base station then performs resource resolution based on one or more rules that are directly specified in terms of the evaluated information attributes or characteristics. Based on this resolution, the base station generates resource-specific resolution instructions for each of the one or more conflicting resources, and then transmits or otherwise signals those instructions to the device 6. The method of FIG. 5 is then implemented by the device 6. In this regard, the device 6 performs resource resolution based on one or more rules that are directly specified in terms of the resolution instructions received from the base station. That is, the one or more rules directly specify that the device 6 is to perform resource resolution in accordance with resolution instructions received from the base station. However, since those instructions are determined by the base station based on the information attributes or characteristics contending for transport, the one or more rules used by the device are nonetheless in a broad sense indirectly associated with those attributes or characteristics. Of course, such embodiments are merely exemplary and can be extrapolated to equally apply to other scenarios where resolution does not depend on attributes or characteristics of information contending for transport.

Broadly, therefore, resource-specific resolution instructions in at least some embodiments explicitly command the device 6 on how to resolve individual conflicting resources, at least when considered in conjunction with any resource-specific resolution instructions received from one or more other points. As one example implementation, the instructions received by the device 6 from any given point in some embodiments comprise a bitmap of subframe-specific values. A '0' in the bitmap for a particular subframe indicates that the subframe is to be used by the device 6 as a normal subframe in accordance with the point's TDD configuration. A '1' in the bitmap for the subframe, by contrast, indicates that the subframe is not to be used by the device 6 for either uplink or downlink transmission.

Regardless of the particular implementation of the resource-specific resolution instructions, though, a base station in at least some embodiments performs resolution in cooperation with resource resolution performed by one or more other base stations to which the device 6 is connected. That is, the resolution instructions sent by each base station to the device 6 are dependent upon one another. The base stations coordinate resolution in this way to ensure that only one of the base stations instructs the device 6 to resolve a given conflicting resource as either a downlink resource or as an uplink resource to be used by the device 6, while others of the base stations instruct the device 6 to resolve the given conflicting resource as a resource not to be used by the device 6 for either uplink or downlink with respect to those base stations. Resolution instructions in this regard can be broadly considered as point-specific scheduling restrictions imposed on the device 6. In any event, such cooperation may entail each base station obtaining information indicating the TDD configuration of each of the other base stations to which the device 6 is connected, such as by receiving that information from those base stations.

Particularly in embodiments where resource resolution is just performed by the device 6, though, without regard to any received resolution instructions, such resolution in some embodiments effectively amounts to device-based scheduling. For instance, in embodiments where resolution is performed collectively for a set of multiple conflicting resources, the device's resolution decisions are in a sense scheduling decisions.

For example, in one embodiment the wireless communication device 6 chooses to multiplex the transmissions in time such that the downlink transmission is done in one specific subframe (e.g. the third subframe 18 of a radio frame) while the uplink transmission is done in another subframe (e.g. the eighth subframe), or vice versa. Alternatively, the wireless communication device 6 transmits either in the uplink or receives in the downlink for a consecutive number of conflicting subframes based on certain conditions, e.g. traffic load, need for control information, etc.

In any event, once resolution is performed according to any of the approaches described above, the device 6 in some embodiments performs transmission and/or reception in dependence on that resolution. For example, in one embodiment, the device 6 makes decisions about whether to transmit or receive particular information within a resolved resource. Consider for instance HARQ feedback for downlink transmissions. In one embodiment, the device 6 decides not to transmit such HARQ feedback in conflicting subframes, but to instead transmit the HARQ feedback in a subframe that is not conflicting. In other words, the device 6 effectively constructs a window for automatic repeat request feedback from the device 6 to exclude any conflicting resource. This can then be further generalized as the wireless communication device 6 transmitting HARQ feedback information according the uplink/downlink configuration based on the amount of uplink subframes being present that are non-conflicting. This effective configuration can be referred to as the uplink-reference configuration used for HARQ feedback information. A similar approach is then foreseen for downlink HARQ feedback information for PHICH and (re)transmission scheduling for PUSCH in LTE embodiments. In the example given in FIG. 6, for instance, the wireless communication device 6 would apply configuration 2 as the uplink reference configuration used for constructing the HARQ feedback window for HARQ feedback. Regardless, in at least some embodiments, such behavior of the device 6 is predefined and known by the base station, so that the device 6 and base station have the same understanding of the HARQ feedback timing.

TDD configurations that are used in a network with dual connectivity mode may depend on scenarios. According to one embodiment of this invention, in a network with dynamic TDD configuration (where different network nodes may have different TDD configuration), the traffic variations is handled by the two links in dual connectivity mode, i.e. the two network nodes use two different TDD configurations, without any dynamic subframe. The variations in the traffic are handled by scheduling the traffic on different nodes. The advantage of this method is that dynamic traffic can be handled while problems of dynamic TDD configurations are avoided. One example of handling dynamic traffic by two different TDD configurations in dual connection mode is assigning a UL-heavy TDD configuration to a small power node 8 with better path loss to devices in a hotspot, and assigning a DL-heavy TDD configuration to a high power node 2 which is better received by devices.

In yet another embodiment, in a network with dual connectivity support, the main traffic can be supported by a fixed TDD or FDD network node (first node in dual connection), while dynamic traffic can be handled by the second network node in dual connection which is configured with dynamic TDD.

Figure 8:
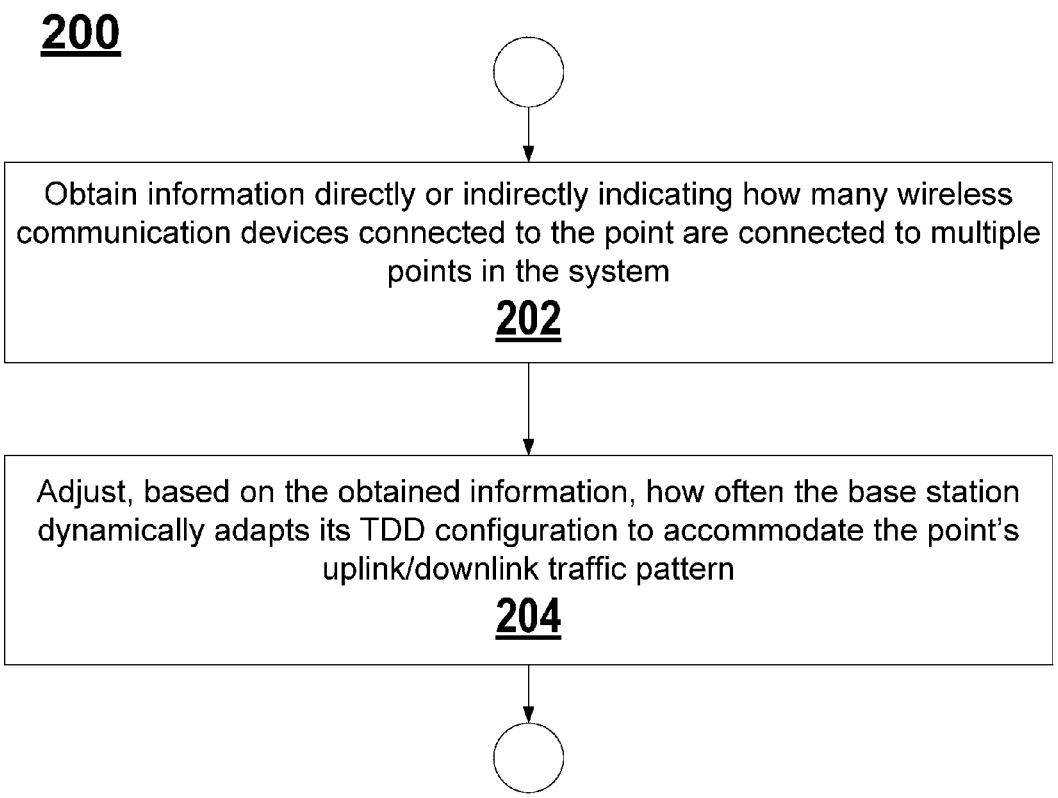
FIG. 8 is a logic flow diagram that illustrates a method implemented by a base station according to one or more embodiments.

Other embodiments herein include the method shown in FIG. 8. The method is performed by a base station as a point in a wireless communication system 14. As shown, the method includes obtaining information directly or indirectly indicating the number of wireless communication devices connected to the point that are actually connected to (or capable of connecting to) multiple points, e.g., as compared to the number of wireless communication devices connected to the point that are not (i.e., the number of legacy devices). The method then entails adjusting how often the base station dynamically adapts its TDD configuration to accommodate the point's UL/DL traffic pattern, based on the obtained information.

In one embodiment, for example, the base station's adjustment amounts to switching between dynamic TDD mode and a fixed or semi-fixed TDD mode. The base station dynamically adapts its TDD configuration more often in dynamic TDD mode than in fixed or semi-fixed TDD mode. In dynamic mode, for example, the base station may adapt its TDD configuration every frame 20 based on a snapshot (or filtered snapshot) of the point's instantaneous traffic pattern, while in semi-fixed TDD mode the base station only adapts its TDD configuration occasionally or very seldom based on a long-term average of the point's traffic pattern. Of course, in fixed TDD mode the base station does not adapt its TDD configuration.

In some embodiments, the base station switches to dynamic TDD mode when there are at least a certain relative number of legacy devices connected to the point (e.g., as compared to multiple-connected devices), and switches to fixed or semi-fixed TDD mode when there are at least a certain relative number of multiple-connected devices connected to the point.

Note that the above embodiments are applicable to any number of scenarios in a TDD system. In one or more embodiments, for example, the uplink and downlink are decoupled. In this case, the uplink transmissions are transmitted to the point with the lowest path loss while downlink transmissions are received from the point with the highest received power. Thus, one point will be associated with downlink transmissions while another point will be associated with uplink transmissions to a dual connected device 6. However, uplink control information (e.g. HARQ feedback, etc) will still be transmitted to the downlink associated point, and the downlink control and feedback information will be transmitted to the uplink associated point. In this example, an uplink transmission from another device can be severely interfered by the downlink transmission from the base station to the dual connected device 6. Thus, the device 6 can be required to receive in downlink, provided that device-to-device interference is not very high.

Moreover, although terminology from 3GPP LTE has been used herein in various examples, this should not be seen as limiting the scope of the invention to only the aforementioned system 14. Other wireless systems 14, including WCDMA, WiMAX, and UMB, may also benefit from exploiting the embodiments herein.

Also note that terminology such as base station/eNodeB should be considered non-limiting and does in particular not imply a certain hierarchical relation between the two. In general, an "eNodeB" and a "wireless communication device" are two devices configured to communicate with each other over some radio channel.

Figure 9:
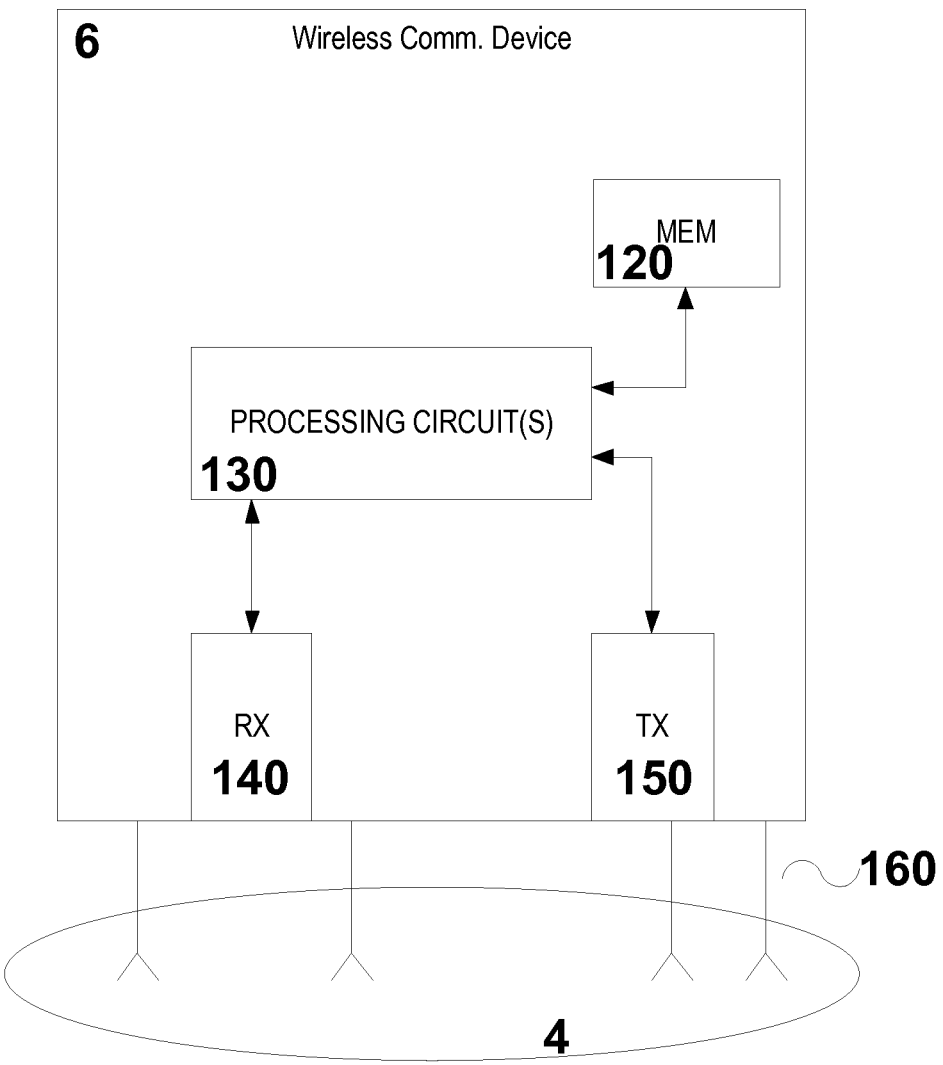
FIG. 9 is a block diagram that illustrates a wireless communication device 6 configured to perform the method of FIG. 6 according to one or more embodiments.

In view of the modifications and variations described above for methods herein, those skilled in the art will appreciate that FIG. 9 illustrates a wireless communication device 6 configured to perform the method of FIG. 5. In this regard, the device 6 includes one or more communication interfaces configured to communicatively connect the device to multiple points in a wireless communication system 14 (i.e., to multiple radio access points or base stations). As shown, these one or more communication interfaces comprise a receiver (RX) 140 and a transmitter (TX) 150 coupled to one or more antennas 160. The device 6 also includes one or more processing circuits 130 configured to implement the method of FIG. 5. For example, these processing circuits 130 in some embodiments include an information obtaining circuit configured to perform the obtaining step of FIG. 5, a conflicting resource determination circuit configured to perform the determining step of FIG. 5, and a resolution circuit configured to perform the resolving step of FIG. 5.

Figure 10:
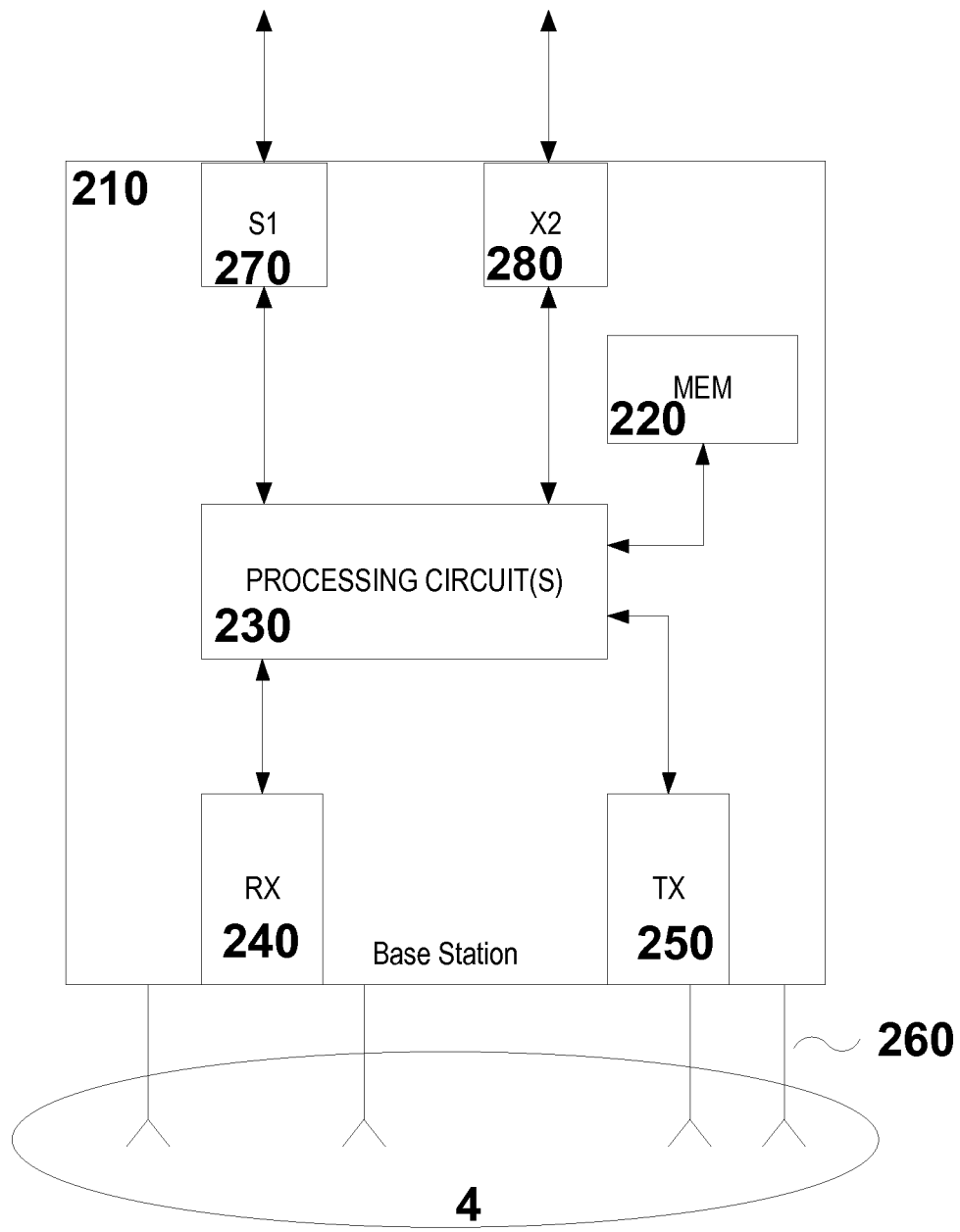
FIG. 10 is a block diagram that illustrates a base station configured to perform the method of FIG. 6 or 7 according to one or more embodiments.

Those skilled in the art will also appreciate that FIG. 10 illustrates a base station 210 configured to perform the method of FIG. 5 or 8. The base station 210 similarly includes one or more communication interfaces configured to communicatively connect the base station 210 to wireless communication devices. As shown, these one or more communication interfaces comprise a receiver (RX) 240 and a transmitter (TX) 250 coupled to one or more antennas 260. The base station 210 however also includes one or more communication interfaces configured to communicatively connect the base station to one or more other base stations 210 and/or other network nodes. As shown, these interfaces include the S1 interface 270 and X2 interface 280 in accordance with LTE standards. Regardless, the base station 210 further includes one or more processing circuits 230 configured to implement the method of FIG. 5 or 8. In addition to the circuits discussed above with respect to FIG. 9's implementation of FIG. 5's method, for instance, the circuits may also include an instruction generation circuit configured to generate resolution instructions for transmission to the device via the one or more communication interfaces. When configured to implement FIG. 8, though, the base station's processing circuits 230 include an obtaining circuit configured to perform the first step of FIG. 8, and an adjustment circuit configured to perform the second step of FIG. 8.

Those skilled in the art will of course appreciate that the above figures are simply examples, and that the depicted circuits may be realized, implemented, or otherwise configured within the node, based upon the execution of computer program instructions stored in memory (e.g., memory 120 in FIG. 9 or memory 220 in FIG. 10) or within another computer readable medium in the entity. Thus, the circuits discussed above may comprise a processor circuit (consisting of, for example, one or more microprocessors, microcontrollers, digital signal processors, or the like) configured with appropriate software and/or firmware in memory 120 or 220 to carry out one or more of the techniques discussed above. The circuits may alternatively be implemented (in whole or in part) by one or more dedicated integrated circuits, such as one or more field-programmable gate arrays (FPGAs) or application-specific integrated circuits (ASICs).

Moreover, embodiments herein have been illustrated in more detail by a number of exemplary embodiments. It should be noted that these embodiments are not mutually exclusive. Components from one embodiment may be tacitly assumed to be present in another embodiment.

The present invention may, of course, be carried out in other specific ways than those herein set forth without departing from the scope and essential characteristics of the invention. The present embodiments are, therefore, to be considered in all respects as illustrative and not restrictive.

What is claimed is:

1. A method implemented in a wireless communication system comprising points that have time division duplex, TDD, configurations, wherein the method is implemented by an apparatus that comprises a particular wireless communication device in the system or comprises a base station as one of the points, wherein the method comprises:

obtaining, by the apparatus, information indicating the TDD configuration of each of multiple points to which the particular wireless communication device is simultaneously connected, the particular device being incapable of simultaneous uplink and downlink communication;

determining, by the apparatus and based on the obtained information, that one or more time-domain radio resources used by the multiple points are conflicting resources defined by the TDD configuration of one or more of the multiple points as being uplink resources and defined by the TDD configuration of one or more others of the multiple points as being downlink resources; and resolving, by the apparatus and for the particular device, each of the one or more conflicting resources as either an uplink resource to be used by the device, a downlink resource to be used by the device, or a resource not to be used by the device, based on one or more rules for optimizing use of conflicting resources, wherein at least one of the one or more rules directly or indirectly specifies that each conflicting resource is to be resolved depending on a comparison of one or more attributes or characteristics of any downlink information contending for transport over that resource with one or more attributes or characteristics of any uplink information also contending for transport over that resource.

2. The method of claim 1, wherein at least one of the one or more rules directly or indirectly specifies that each conflicting resource is to be resolved as a downlink resource or as an uplink resource depending respectively on whether the content of any downlink information contending for transport over that resource or the content of any uplink information also contending for transport over that resource is defined as more important.

3. The method of claim 1, wherein at least one of the one or more rules directly or indirectly specifies that each conflicting resource is to be resolved as a downlink resource or as an uplink resource depending respectively on whether the point from which any downlink information contending for transport over that resource or the point to which any uplink information also contending for transport over that resource is defined as having a higher priority.

4. The method of claim 1, wherein at least one of the one or more rules directly or indirectly specifies that each conflicting resource is to be resolved as a downlink resource or as an uplink resource depending respectively on whether any downlink information contending for transport over that resource or any uplink information also contending for transport over that resource is more likely to be reliably transported over the resource.

5. The method of claim 1, wherein at least one of the one or more rules directly or indirectly specifies that each conflicting resource is to be resolved as a downlink resource or as an uplink resource depending respectively on whether the amount of any downlink information contending for transport over that resource or the amount of any uplink information also contending for transport over that resource is greater.

6. The method of claim 1, wherein the one or more rules govern said resolving collectively for a set of multiple conflicting resources so as to collectively optimize use of that set.

7. The method of claim 6, wherein said resolving comprises performing said resolving so as to time-multiplex resources resolved as downlink resources with resources resolved as uplink resources.

8. The method of claim 1, wherein the one or more rules directly or indirectly specify that each conflicting resource is to be unconditionally resolved as a resource not to be used by the device, such that conflicting resources remain reserved for devices not simultaneously connected to multiple points.

9. The method of claim 8, wherein the method is implemented by the device and further comprises refraining from monitoring for control information associated with data transmissions over conflicting resources.

10. A method implemented in a wireless communication system comprising points that have time division duplex, TDD, configurations, wherein the method is implemented by an apparatus that comprises a particular wireless communication device in the system or comprises a base station as one of the points, wherein the method comprises:
   obtaining, by the apparatus, information indicating the TDD configuration of each of multiple points to which the particular wireless communication device is simultaneously connected, the particular device being incapable of simultaneous uplink and downlink communication;
   determining, by the apparatus and based on the obtained information, that one or more time-domain radio resources used by the multiple points are conflicting resources defined by the TDD configuration of one or more of the multiple points as being uplink resources and defined by the TDD configuration of one or more others of the multiple points as being downlink resources; and
   resolving, by the apparatus and for the particular device, each of the one or more conflicting resources as either an uplink resource to be used by the device, a downlink resource to be used by the device, or a resource not to be used by the device, based on one or more rules for optimizing use of conflicting resources, wherein at least one of the multiple points is associated with downlink transmissions to the device and at least one other of the multiple points is associated with uplink transmissions from the device, and wherein the one or more rules condition a conflicting resource being resolved as a downlink resource on a level of device-to-device interference being below a defined threshold level.

11. The method of claim 1, further comprising constructing a window for automatic repeat request feedback from the device to exclude any conflicting resource.

12. A method implemented in a wireless communication system comprising points that have time division duplex, TDD, configurations, wherein the method is implemented by a particular wireless communication device in the system, wherein the method comprises:
   obtaining, by the particular wireless communication device, information indicating the TDD configuration of each of multiple points to which the particular wireless communication device is simultaneously connected, the particular device being incapable of simultaneous uplink and downlink communication;
   determining, by the particular wireless communication device and based on the obtained information, that one or more time-domain radio resources used by the multiple points are conflicting resources defined by the TDD configuration of one or more of the multiple points as being uplink resources and defined by the TDD configuration of one or more others of the multiple points as being downlink resources; and
   resolving, by the particular wireless communication device and for the particular device, each of the one or more conflicting resources as either an uplink resource to be used by the device, a downlink resource to be used by the device, or a resource not to be used by the device, based on one or more rules for optimizing use of conflicting resources, and wherein the one or more rules directly specify that the device is to perform resource resolution in accordance with resource-specific resolution instructions received from one or more of the multiple points to which the device is connected.

13. The method of claim 12, wherein the resource-resolution instructions for each of the one or more conflicting resources implicitly indicate how the conflicting resource is to be resolved, by indicating whether the device has been scheduled for an uplink transmission to or a downlink transmission from a given point over the conflicting resource.

14. A method implemented in a wireless communication system comprising points that have time division duplex, TDD, configurations, wherein the method is implemented by a base station as one of the points, wherein the method comprises:
   obtaining, by the base station, information indicating the TDD configuration of each of multiple points to which a particular wireless communication device in the system is simultaneously connected, the particular device being incapable of simultaneous uplink and downlink communication;

determining, by the base station and based on the obtained information, that one or more time-domain radio resources used by the multiple points are conflicting resources defined by the TDD configuration of one or more of the multiple points as being uplink resources and defined by the TDD configuration of one or more others of the multiple points as being downlink resources; and resolving, by the base station and for the particular device, each of the one or more conflicting resources as either an uplink resource to be used by the device, a downlink resource to be used by the device, or a resource not to be used by the device, based on one or more rules for optimizing use of conflicting resources;

generating, based on said resolving, resource-specific resolution instructions for each of the one or more conflicting resources; and transmitting the generated instructions to the device.

15. The method of claim 14, wherein said resolving is performed in cooperation with resource resolution performed by one or more other base stations as one or more others of the points to ensure that only one of the base stations instructs the device to resolve a given conflicting resource as either a downlink resource or as an uplink resource to be used by the device, while others of the base stations instruct the device to resolve the given conflicting resource as a resource not to be used by the device.

16. The method of claim 14, wherein the resource-resolution instructions for each of the one or more conflicting resources implicitly indicate how the conflicting resource is to be resolved, by indicating whether the device has been scheduled for an uplink transmission to or a downlink transmission from a given point over the conflicting resource.

17. A method implemented by a base station as a point in a wireless communication system, wherein the method comprises:

obtaining, by the base station, information directly or indirectly indicating how many wireless communication devices connected to the point are connected to multiple points in the system; and adjusting, by the base station and based on the obtained information, how often the base station dynamically adapts its time division duplex, TDD, configuration to accommodate the point's uplink/downlink traffic pattern, wherein said adjusting comprises switching between a dynamic TDD mode and a fixed or semi-fixed TDD mode, wherein the base station dynamically adapts its TDD configuration more often in dynamic mode than in semi-fixed mode and does not adapt its TDD configuration in fixed mode.

18. The method of claim 17, wherein said switching comprises:

switching to dynamic TDD mode when there are at least a certain number of multiple-connected devices connected to the point, relative to the number of non-multiple-connected devices connected to the point; and switching to fixed or semi-fixed TDD mode when there are at least a certain number of non-multiple-connected devices connected to the point, relative to the number of multiple-connected devices connected to the point.

19. An apparatus in a wireless communication system comprising points that have time division duplex, TDD, configurations, the apparatus comprising:

one or more communication interfaces configured to communicatively connect the apparatus to the system; and one or more processing circuits configured to:
obtain information indicating the TDD configuration of each of multiple points to which a particular wireless communication device is simultaneously connected, the particular device being incapable of simultaneous uplink and downlink communication; and determine, based on the obtained information, that one or more time-domain radio resources used by the multiple points are conflicting resources defined by the TDD configuration of one or more of the multiple points as being uplink resources and defined by the TDD configuration of one or more others of the multiple points as being downlink resources; and resolve, for the particular wireless communication device, each of the one or more conflicting resources as either an uplink resource to be used by the device, a downlink resource to be used by the device, or a resource not to be used by the device, based on one or more rules for optimizing use of conflicting resources, wherein at least one of the one or more rules directly or indirectly specifies that each conflicting resource is to be resolved depending on a comparison of one or more attributes or characteristics of any downlink information contending for transport over that resource with one or more attributes or characteristics of any uplink information also contending for transport over that resource.

20. A base station as a point in a wireless communication system, wherein the base station comprises:

one or more communication interfaces configured to communicatively connect the base station to wireless communication devices in the system; and one or more processing circuits configured to:
obtain information directly or indirectly indicating how many wireless communication devices connected to the point are connected to multiple points in the system; and adjust, based on the obtained information, how often the base station dynamically adapts its time division duplex, TDD, configuration to accommodate the point's uplink/downlink traffic pattern;

wherein the one or more processing circuits are configured to switch between a dynamic TDD mode and a fixed or semi-fixed TDD mode, and to adapt the base station's TDD configuration more often in dynamic mode than in semi-fixed mode and to not adapt the base station's TDD configuration in fixed mode.

21. The base station of claim 20, wherein the one or more processing circuits are configured to:

switch to dynamic TDD mode when there are at least a certain number of multiple-connected devices connected to the point, relative to the number of non-multiple-connected devices connected to the point; and switch to fixed or semi-fixed TDD mode when there are at least a certain number of non-multiple-connected devices connected to the point, relative to the number of multiple-connected devices connected to the point.

22. An apparatus in a wireless communication system comprising points that have time division duplex, TDD, configurations, the apparatus comprising:

one or more communication interfaces configured to communicatively connect the apparatus to the system; and one or more processing circuits configured to:
obtain information indicating the TDD configuration of each of multiple points to which a particular wireless communication device is simultaneously connected, the particular device being incapable of simultaneous uplink and downlink communication; and determine, based on the obtained information, that one or more time-domain radio resources used by the multiple points are conflicting resources defined by the TDD configuration of one or more of the multiple points as being uplink resources and defined by the TDD configuration of one or more others of the multiple points as being downlink resources; and resolve, for the particular wireless communication device, each of the one or more conflicting resources as either an uplink resource to be used by the device, a downlink resource to be used by the device, or a resource not to be used by the device, based on one or more rules for optimizing use of conflicting resources, wherein at least one of the multiple points is associated with downlink transmissions to the device and at least one other of the multiple points is associated with uplink transmissions from the device, and wherein the one or more rules condition a conflicting resource being resolved as a downlink resource on a level of device-to-device interference being below a defined threshold level.

23. A particular wireless communication device in a wireless communication system comprising points that have time division duplex, TDD, configurations, the device comprising:

one or more communication interfaces configured to communicatively connect the device to the system; and one or more processing circuits configured to:
obtain information indicating the TDD configuration of each of multiple points to which the particular wireless communication device is simultaneously connected, the particular device being incapable of simultaneous uplink and downlink communication;

determine, based on the obtained information, that one or more time-domain radio resources used by the multiple points are conflicting resources defined by the TDD configuration of one or more of the multiple points as being uplink resources and defined by the TDD configuration of one or more others of the multiple points as being downlink resources; and resolve, for the particular wireless communication device, each of the one or more conflicting resources as either an uplink resource to be used by the device, a downlink resource to be used by the device, or a resource not to be used by the device, based on one or more rules for optimizing use of conflicting resources, wherein the one or more rules directly specify that the device is to perform resource resolution in accordance with resource-specific resolution instructions received from one or more of the multiple points to which the device is connected.

24. A base station as a point in a wireless communication system that comprises points that have time division duplex, TDD, configurations, the base station comprising:

one or more communication interfaces configured to communicatively connect the base station to the system; and one or more processing circuits configured to:
obtain information indicating the TDD configuration of each of multiple points to which a particular wireless communication device in the system is simultaneously connected, the particular device being incapable of simultaneous uplink and downlink communication;

determine, based on the obtained information, that one or more time-domain radio resources used by the multiple points are conflicting resources defined by the TDD configuration of one or more of the multiple points as being uplink resources and defined by the TDD configuration of one or more others of the multiple points as being downlink resources; and resolve, for the particular wireless communication device, each of the one or more conflicting resources as either an uplink resource to be used by the device, a downlink resource to be used by the device, or a resource not to be used by the device, based on one or more rules for optimizing use of conflicting resources;

generate, based on said resolving, resource-specific resolution instructions for each of the one or more conflicting resources; and transmit the generated instructions to the device.

* * * * *